(12) United States Patent
Santello et al.

(10) Patent No.: US 10,558,269 B2
(45) Date of Patent: Feb. 11, 2020

(54) DEVICE FOR PROVIDING CUTANEOUS SENSATIONS TO A FINGERTIP

(71) Applicants: ARIZONA BOARD OF REGENTS ON BEHALF OF ARIZONA STATE UNIVERSITY, Scottsdale, AZ (US); Francesco Chinello, Grosseto (IT); Daisuke Shibata, Albuquerque, NM (US); Domenico Prattichizzo, Siena (IT)

(72) Inventors: Marco Santello, Gilbert, AZ (US); Francesco Chinello, Grosseto (IT); Daisuke Shibata, Albuquerque, NM (US); Domenico Prattichizzo, Siena (IT)

(73) Assignees: ARIZONA BOARD OF REGENTS ON BEHALF OF ARIZONA STATE UNIVERSITY, Scottsdale, Arizona, Albuquerque, NM (US); STC.UNM, Scottsdale, Arizona, Albuquerque, NM (US)

( * ) Notice: Subject to any disclaimer, the term of this patent is extended or adjusted under 35 U.S.C. 154(b) by 0 days.

(21) Appl. No.: 16/336,065

(22) PCT Filed: Sep. 22, 2017

(86) PCT No.: PCT/US2017/052968
§ 371 (c)(1),
(2) Date: Mar. 22, 2019

(87) PCT Pub. No.: WO2018/057898
PCT Pub. Date: Mar. 29, 2018

(65) Prior Publication Data
US 2019/0227632 A1 Jul. 25, 2019

Related U.S. Application Data

(60) Provisional application No. 62/398,733, filed on Sep. 23, 2016.

(51) Int. Cl.
*G06F 3/01* (2006.01)
*F16H 19/04* (2006.01)

(52) U.S. Cl.
CPC ............. *G06F 3/016* (2013.01); *F16H 19/04* (2013.01); *G06F 2203/0331* (2013.01)

(58) Field of Classification Search
CPC .. G06F 3/016; G06F 2203/0331; G06F 3/017; G06F 3/018; F16H 129/04; F16H 19/08; F16H 21/00
(Continued)

(56) References Cited

U.S. PATENT DOCUMENTS

| 6,955,094 | B1 | 10/2005 | Tarler | |
| 2001/0052893 | A1* | 12/2001 | Jolly | B62D 5/006 345/156 |
| 2008/0091121 | A1 | 4/2008 | Sun et al. | |
| 2012/0038468 | A1* | 2/2012 | Provancher | G06F 3/016 340/407.1 |

(Continued)

FOREIGN PATENT DOCUMENTS

WO 2014099038 A1 6/2014

OTHER PUBLICATIONS

International Preliminary Report on Patentability for International Patent Application No. PCT/US2017/052968, dated Apr. 4, 2019, 8 pages.

(Continued)

*Primary Examiner* — Terrance L Kenerly
(74) *Attorney, Agent, or Firm* — Withrow & Terranova, P.L.L.C.

(57) ABSTRACT

A device for providing cutaneous sensations to a fingertip includes a lower base, an upper platform positioned over and mechanically connected to the lower base, and a shear plate positioned between the lower base and the upper platform and mechanically connected to the lower base. When a fingertip is positioned between the upper platform and the lower base, the upper platform is selectively vertically (Continued)

translatable relative to the lower base to provide a compressive force, and the shear plate is selectively laterally translatable relative to the lower base to provide a shear force. Accordingly, a wearable fingertip device having two degrees-of-freedom (DoF) to provide consecutive and/or concurrent compressive force and/or shear force to a fingertip is provided. The wearable fingertip device can be used in various scenarios; is portable, easily wearable, and easily manufacturable; and has low overall operating power requirements.

21 Claims, 9 Drawing Sheets

(58) Field of Classification Search
USPC .......................................................... 310/10
See application file for complete search history.

(56) References Cited

U.S. PATENT DOCUMENTS

| 2013/0012853 | A1 | 1/2013 | Brown |
| 2015/0057582 | A1 | 2/2015 | Morrison et al. |
| 2016/0342209 | A1* | 11/2016 | Provancher ............. G06F 3/016 |

OTHER PUBLICATIONS

International Search Report and Written Opinion for International Patent Application No. PCT/US2017/052968, dated Dec. 26, 2017, 11 pages.

Chinello, Francesco, et al., "A three DoF wearable tactile display for exploration and manipulation of virtual objects," IEEE Haptics Symposium, Mar. 2012, Vancouver, Canada, pp. 71-76.

Pacchierotti, Claudio, et al., "Cutaneous haptic feedback to ensure the stability of robotic teleoperation systems," The International Journal of Robotics Research, vol. 34, Issue 14, pp. 1773-1787.

Pacchierotti, Claudio, et al., "Improving Transparency in Teleoperation by Means of Cutaneous Tactile Force Feedback," ACM Transactions on Applied Perception, vol. 11, Issue 1, Apr. 2014, 16 pages.

Pacchierotti, Claudio, et al., "RemoTouch: A System for Remote Touch Experience," International Symposium on Robot and Human Interactive Communication, Sep. 2010, Viareggio, Italy, IEEE, pp. 676-679.

Pacchierotti, Claudio, et al., "Two Finger Grasping Simulation with Cutaneous and Kinesthetic Force Feedback," Haptics: Perception, Devices, Mobility, and Communications, Eurohaptics 2012, Lecture Notes in Computer Science, 2012, Springer-Verlag Berlin Heidelberg, pp. 373-382.

Prattichizzo, Domenico, et al., "Cutaneous Force Feedback as a Sensory Subtraction Technique in Haptics," IEEE Transactions on Haptics, vol. 5, Issue 4, Oct. 2012, pp. 289-300.

Prattichizzo, Domenico, et al., "Towards Wearability in Fingertip Haptics: A 3-DoF Wearable Device for Cutaneous Force Feedback," IEEE Transactions on Haptics, vol. 6, Issue 4, Oct. 2013, pp. 506-516.

Prattichizzo, Domenico, et al., "Using a Fingertip Tactile Device to Substitute Kinesthetic Feedback in Haptic Interaction," Haptics: Generating and Perceiving Tangible Sensations, Eurohaptics 2010, Lecture Notes in Computer Science, Amsterdam, The Netherlands, Spring Verlag, pp. 125-130.

\* cited by examiner

DEVICE FOR PROVIDING CUTANEOUS SENSATIONS TO A FINGERTIP

STATEMENT OF RELATED APPLICATIONS

This application is a 35 U.S.C. § 371 national phase filing of International Application No. PCT/US2017/052968 filed on Sep. 22, 2017, and claims the benefit of U.S. Provisional Patent Application No. 62/398,733 filed on Sep. 23, 2016, wherein the disclosures of the foregoing applications are hereby incorporated by reference herein in their respective entireties.

TECHNICAL FIELD

This disclosure relates to a device for providing cutaneous sensations to a fingertip.

BACKGROUND

Cutaneous devices provide one or more types of skin stimulation. Some cutaneous devices provide skin stimulation to a fingertip. In particular, some wearable fingertip devices can provide a slanted compressive force against a finger pulp (e.g., by a flat slanting surface with three degrees of freedom (DoF) compressed against the finger pulp using three independently operated pulleys).

However, such devices tend to be complicated to manufacture or assemble, limited in the types of forces that can be provided, and/or not easily wearable or portable. Current devices may also be limited in the maximum degree of force provided (e.g., less than 2 N). Such devices cannot provide compressive forces and shear forces upon the same area with a simple design, thereby limiting functionality and increasing cost.

SUMMARY

Provided herein is a device for providing cutaneous sensations to a fingertip. The device includes a lower base, an upper platform positioned over and mechanically connected to the lower base, and a shear plate positioned between the lower base and the upper platform and mechanically connected to the lower base. When the fingertip is positioned between the upper platform and the lower base, the upper platform is selectively translatable in a vertical direction relative to the lower base to provide a compressive force, and the shear plate is selectively translatable in a lateral direction relative to the lower base to provide a shear force. In this manner, a wearable fingertip device having two degrees-of-freedom (DoF) to provide compressive force (e.g., vertical force) and/or shear force (e.g., tangential force) to a fingertip (e.g., the finger pulp) is provided. These forces can be applied to the same area and/or at the same time to provide controllable fingertip stimulation. The wearable fingertip device can be used in one or more various scenarios (e.g., rehabilitation, research, gaming, etc.); is portable, easily wearable, and easily manufacturable (e.g., with parts amenable to rapid prototyping); and has low overall operating power requirements.

In one aspect, a device for providing cutaneous sensations to a fingertip is provided. The device includes a lower base, an upper platform positioned over the lower base and mechanically connected to the lower base, and a shear plate positioned between the lower base and the upper platform and mechanically connected to the lower base. The upper platform is selectively vertically translatable relative to the lower base to provide a compressive force to the fingertip when the fingertip is positioned between the upper platform and the lower base. The shear plate is selectively laterally translatable relative to the lower base to provide a shear force to the fingertip when the fingertip is positioned between the upper platform and the lower base.

In another aspect, a device for providing cutaneous sensations to a fingertip is provided. The device includes a lower base, an upper platform positioned over the lower base, and a first rack and a first pinion mechanically connecting the lower base to the upper platform. The upper platform is configured to vertically translate relative to the lower base when the first pinion is rotated. The device further includes a first motor mechanically connected to the first pinion and configured to rotate the first pinion to provide a compressive force to the fingertip when the fingertip is positioned between the upper platform and the lower base. The device further includes a shear plate positioned between the lower base and the upper platform. The device further includes a second rack and a second pinion mechanically connecting the shear plate to the lower base, the shear plate being configured to laterally translate relative to the lower base when the second pinion is rotated. The device further includes a second motor mechanically connected to the second pinion and configured to rotate the second pinion to provide a shear force to the fingertip when the fingertip is positioned between the upper platform and the lower base.

In another aspect, a device for providing cutaneous sensations to a fingertip is provided. The device includes a lower base and a first rack. An end of the first rack is fixedly attached to the lower base. The device further includes a first pinion mechanically engaged with the first rack. The device further includes an upper platform positioned over the lower base and defining a rack aperture. At least a portion of the first rack is positioned within the rack aperture. The device further includes a first motor mounted to the upper platform. The first motor is mechanically connected to the first pinion. The device further includes a shear plate positioned between the lower base and the upper platform. The shear plate comprises a second rack extending from a bottom surface of the shear plate. The device further includes a second pinion mechanically engaged with the second rack, and a second motor mounted to the lower base. The second motor is mechanically connected to the second pinion. The first motor is configured to rotate the first pinion to vertically translate the upper platform relative to the lower base to provide a compressive force to the fingertip when the fingertip is positioned between the upper platform and the lower base. The second motor is configured to rotate the second pinion to laterally translate the shear plate relative to the lower base to provide a shear force to the fingertip when the fingertip is positioned between the upper platform and the lower base.

In certain embodiments, the device includes a first rack and a first pinion mechanically connecting the upper platform to the lower base, and a first motor being configured to drive the first pinion relative to the first rack to selectively vertically translate the upper platform relative to the lower base. In certain embodiments, a second rack and a second pinion mechanically connect the shear plate to the lower base, and a second motor is configured to drive the second pinion relative to the second rack to selectively laterally translate the shear plate relative to the lower base. In certain embodiments, the second rack is positioned along a bottom surface of the shear plate.

In certain embodiments, a first rack and a first pinion mechanically connect the upper platform to the lower base. A first motor is configured to drive the first pinion relative to the first rack to selectively vertically translate the upper platform relative to the lower base. A second rack and a second pinion mechanically connect the shear plate to the lower base. A second motor is configured to drive the second pinion relative to the second rack to selectively laterally translate the shear plate relative to the lower base. The first motor is mounted to the upper platform, and the second motor is mounted to the lower base. In certain embodiments, the device further comprises a third rack and a third pinion mechanically connecting the upper platform to the lower base. The first rack and the third rack are positioned on opposite lateral sides of the upper platform and the lower base, and the third pinion being mechanically engaged with the first pinion and the third rack.

In certain embodiments, the device further comprises an upper angular sensor arranged in sensory communication with at least one of the first motor or the first pinion. In certain embodiments, the device further comprises a lower angular sensor arranged in sensory communication with at least one of the second motor or the second pinion.

In certain embodiments, the device further comprises at least one force sensor that is positioned between the shear plate and the upper platform, and is arranged to sense a compression force. In certain embodiments, the device further comprises at least one finger support that is mounted to the upper platform and is positioned between the shear plate and the upper platform. The at least one finger support is configured to engage at least a portion of a top of a fingertip.

In certain embodiments, vertical translation of the upper platform relative to the lower base is generally perpendicular to lateral translation of the shear plate relative to the lower base. In certain embodiments, the device is configured for vertical translation of the upper platform relative to the lower base concurrently with lateral translation of the shear plate relative to the lower base.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
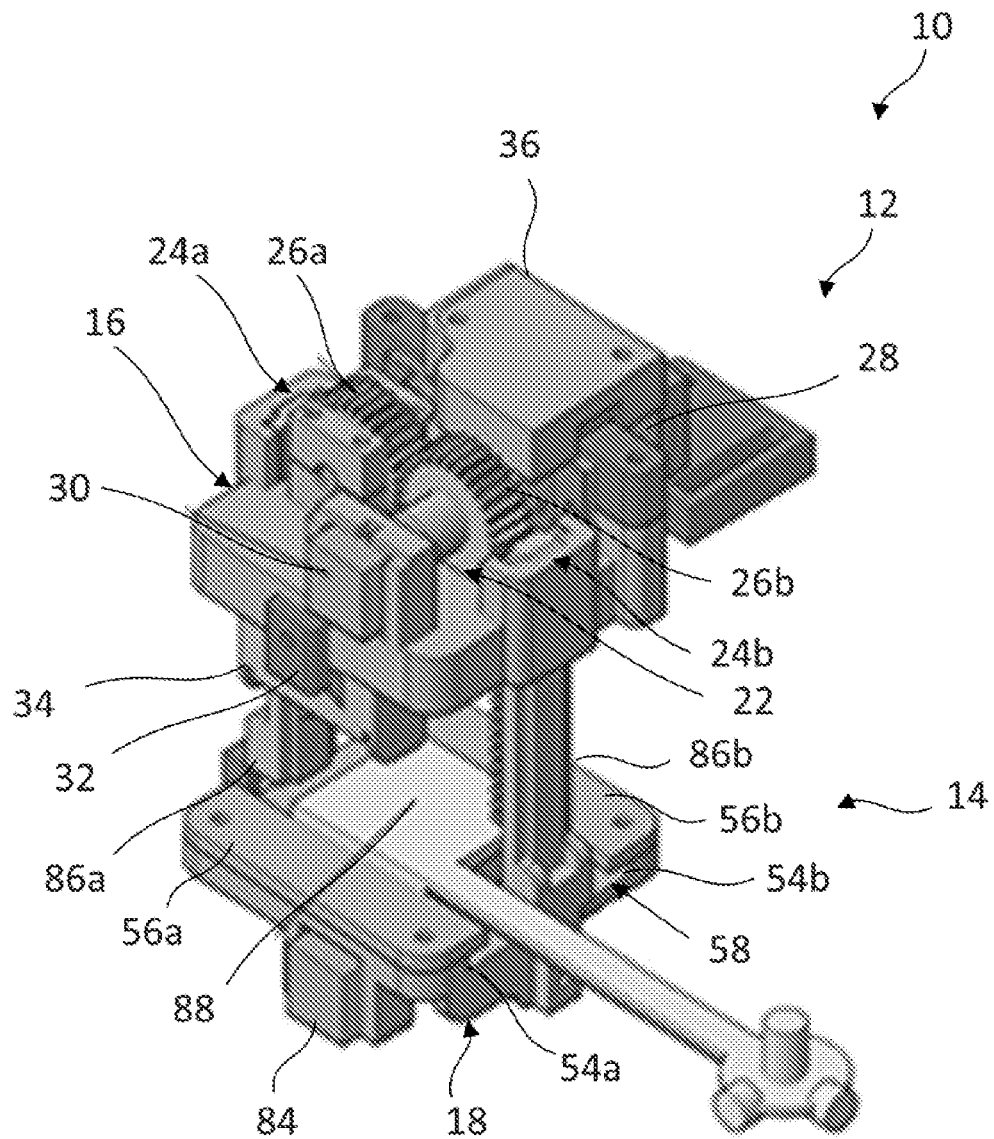
FIG. 1 is an assembled upper front perspective view of a wearable fingertip device for providing cutaneous sensations to a fingertip.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below," "above," "upper," "lower," "horizontal," and/or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Provided herein is a device for providing cutaneous sensations to a fingertip. More specifically, disclosed is a wearable fingertip device having two degrees-of-freedom (DoF) to provide compressive force (e.g., vertical force) and/or shear force (e.g., tangential force) to a fingertip (e.g., the finger pulp). These forces can be applied to the same area and/or at the same time to provide controllable fingertip stimulation. In certain embodiments, the wearable fingertip device can provide up to 4.5 N of compressive force and up to 4 N of shear force. The wearable fingertip device has a simple design, and is both portable and easily wearable. The wearable fingertip device provides a number of degrees of freedom, a wide range of force magnitudes, and a shear force under the finger pulp.

The wearable fingertip device can be used in one or more various scenarios. For example, the wearable fingertip device may be used for rehabilitation (e.g., for hand grasping), for research (e.g., for neuroscience on human perception), for gaming (e.g., tactile feedback for enhanced virtual interaction), and so on. Further, the wearable fingertip device may be easily manufactured through use of rapid prototyping parts, and may simulate a contact scenario where a user is able to interact with or grip virtual objects without using complex setup processes. The wearable fingertip device is portable, easily wearable, and exhibits low overall power requirements for operation.

Figure 2:
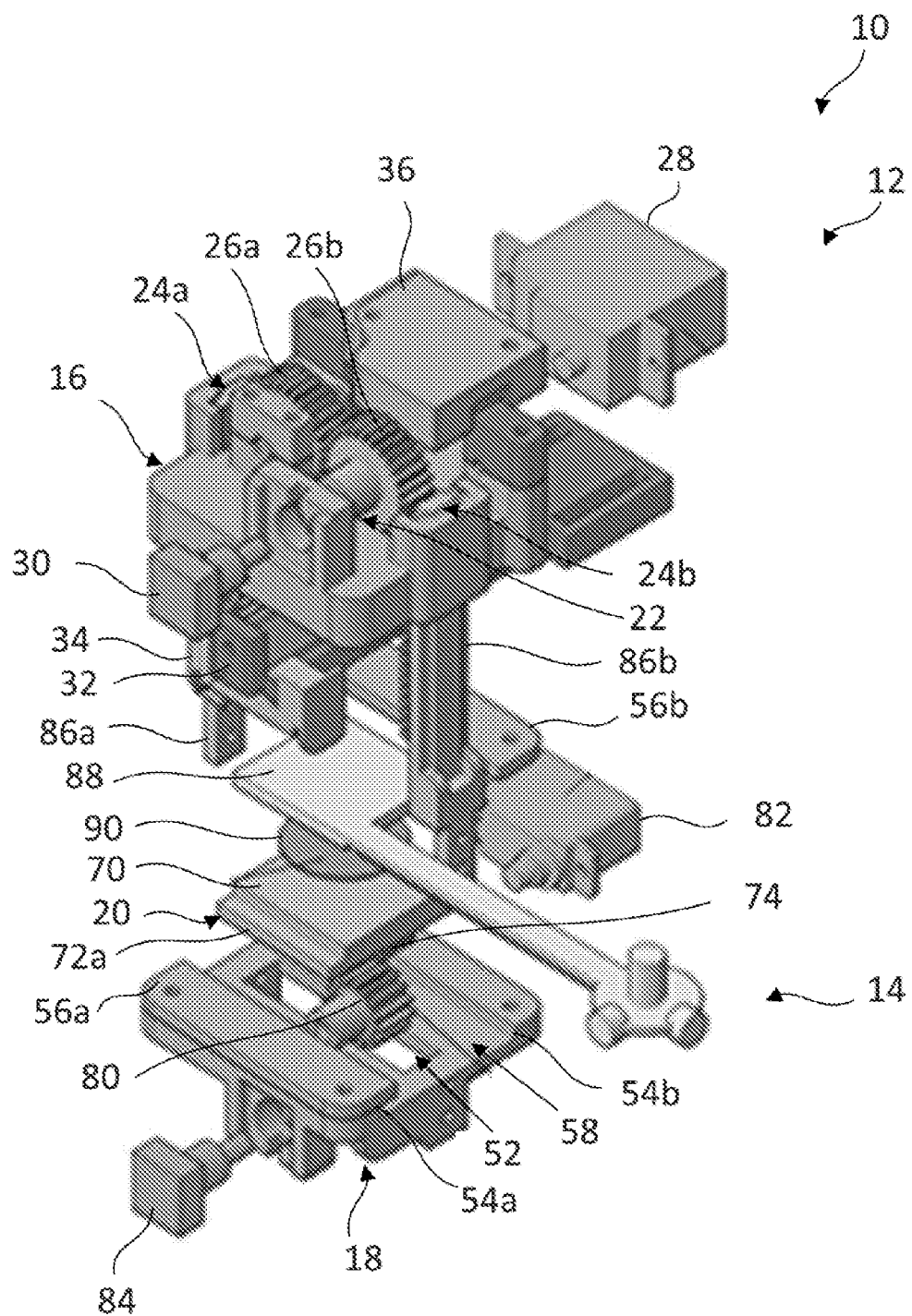
FIG. 2 is an exploded upper front perspective view of the wearable fingertip device of FIG. 1.
Figure 3:
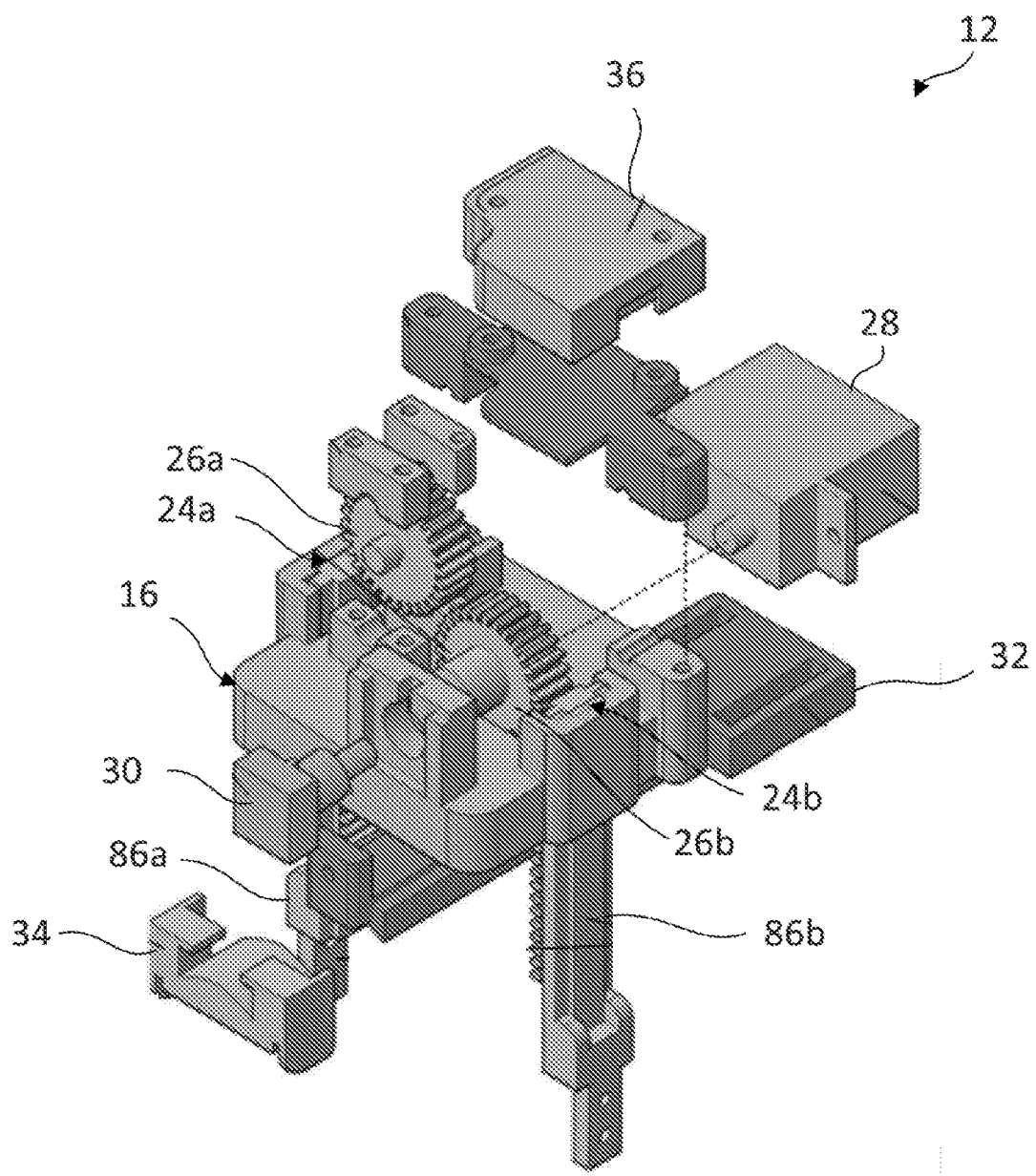
FIG. 3 is an exploded upper front perspective view of an upper assembly of the wearable fingertip device of FIG. 1.
Figure 4:
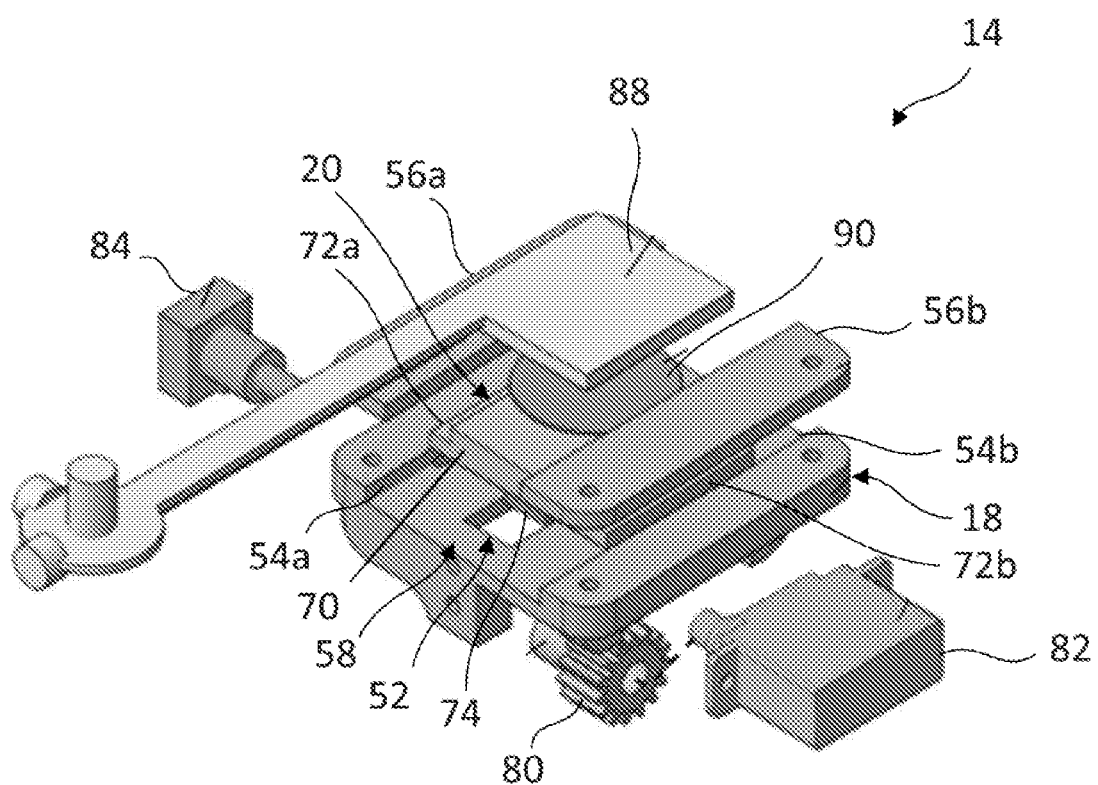
FIG. 4 is an exploded upper rear perspective view of a lower assembly of the wearable fingertip device of FIG. 1.

FIGS. 1-4 are views of a wearable fingertip device 10 for providing cutaneous sensations to a fingertip. More specifically, FIG. 1 is an assembled upper front perspective view of the wearable fingertip device 10. FIG. 2 is an exploded upper front perspective view of the wearable fingertip device 10 of FIG. 1. FIG. 3 is an exploded upper front perspective view of an upper assembly 12 of the wearable fingertip device 10 of FIG. 1. FIG. 4 is an exploded upper rear perspective view of a lower assembly 14 of the wearable fingertip device 10 of FIG. 1.

The wearable fingertip device 10 comprises the upper assembly 12 (including an upper platform 16) positioned over and mechanically connected with the lower assembly 14 (including a lower base 18 and a shear plate 20). The upper platform 16 is positioned over, and mechanically connected to, the lower base 18. The upper platform 16 is selectively vertically translatable relative to the lower base 18 to provide a compressive force to a fingertip when the fingertip is positioned between the upper platform 16 and the lower base 18. The shear plate 20 is positioned between the lower base 18 and the upper platform 16 and mechanically connected (e.g., coupled, engaged, etc.) to the lower base 18. The shear plate 20 is selectively laterally translatable relative to the lower base 18 to provide a shear force to the fingertip when the fingertip is positioned between the upper platform 16 and the lower base 18. In this way, the wearable fingertip device 10, when worn by a user, provides normal and shear forces to a fingertip (e.g., finger pulp).

In certain embodiments, the upper platform 16 may comprise a central slot 22 and/or at least one compressive rack aperture (e.g., left compressive rack aperture 24a, and right compressive rack aperture 24b). The central slot 22 as well as the left and right compressive rack apertures 24a, 24b may be directly connected to one another (e.g., with no intervening material therebetween). More specifically, the central slot 22 may extend from (or proximate to) a left side of the upper platform 16 to (or proximate to) a right side of the upper platform 16. Also, the central slot 22 may extend partially or completely through the upper platform 16 (e.g., from a top surface to a bottom surface of the upper platform 16).

In certain embodiments, the upper assembly 12 further comprises at least one compressive pinion (e.g., left compressive pinion 26a and/or right compressive pinion 26b), and a compressive motor 28 (e.g., servomotor, first motor, actuator, etc.) mechanically connected to and driving the at least one compressive pinion 26a, 26b. In certain embodiments, the compressive motor 28 can provide a maximum torque of 10 N·cm with a speed of 60°/s. In certain embodiments, the compressive motor 28 is mounted to the upper platform 16 (e.g., the compressive motor 28 is positioned on or proximate to a top surface of the upper platform 16) and the compressive motor 28 is mechanically connected to the right compressive pinion 26b mounted to the upper platform 16 (e.g., positioned on or proximate to the top surface of the upper platform 16). The right compressive pinion 26b (e.g., first pinion, right rotational gear, right rotational wheel, etc.) is mechanically connected to the left compressive pinion 26a (third pinion, left rotational gear, left rotational wheel, left idler gear, left reverse idler, etc.), which is also mounted to the upper platform 16. Accordingly, the compressive motor 28 drives the right compressive pinion 26b in a first direction (e.g., clockwise), which drives the left compressive pinion 26a in a second direction opposite the first direction (e.g., counter-clockwise). At least a portion of the left and/or right compressive pinions 26a, 26b is positioned in the central slot 22, thus decreasing the size (e.g., height) of the upper assembly 12.

In certain embodiments, the upper assembly 12 may comprise an angular sensor 30 arranged in sensory communication with the right compressive pinion 26b and/or the compressive motor 28 to angularly measure angular position and/or force of the right compressive pinion 26b. In other words, the angular sensor 30 may measure the rotational angle of the compressive motor 28, which permits computation of vertical compression exerted on the fingertip in terms of displacement.

In certain embodiments, the upper assembly 12 further comprises a finger support 32 and/or fingertip support 34. The finger support 32 and/or fingertip support 34 may have a contoured bottom surface to engage at least a portion of a top of a finger inserted into the wearable fingertip device 10. For example, the finger support 32 may have a contoured bottom surface to engage at least a portion of a finger, such as the distal phalange (e.g., tip segment, first segment, etc.), middle phalange (e.g., middle segment, second segment, etc.), proximal phalange (e.g., base segment, third segment, etc.), distal interphalangeal joint (e.g., top knuckle, first knuckle, etc.), proximal interphalangeal joint (e.g., middle knuckle, second knuckle, etc.), first joint (e.g., base knuckle, third knuckle, etc.), etc. The fingertip support 34 may have a contoured bottom surface to engage at least a portion of a fingertip, such as the distal phalange (e.g., tip segment, first segment, etc.), fingernail, etc. The finger support 32 may be elongated and extend beyond a rear (e.g., proximal) lateral surface of the upper platform 16. The fingertip support 34 may be positioned at a front (e.g., distal) lateral surface of the upper platform 16 and/or at an end of the finger support 32. Further, the fingertip support 34 may be adjustable and removably attached to the finger support 32.

In certain embodiments, the upper assembly 12 includes an electronics housing 36 mounted to the upper platform 16. The electronics housing 36 may house (e.g., contain) one or more electronic components for controlling operation of the wearable fingertip device 10, such as a battery, memory, processor, etc. (as explained below in more detail).

In certain embodiments, the lower base 18 of the lower assembly 14 has a central slot 52 positioned therein. The central slot 52 may extend from (or proximate to) a left side of the lower base 18 to (or proximate to) a right side of the lower base 18. Also, the central slot 52 may extend partially or completely through the lower base 18 (e.g., from a top surface to a bottom surface of the lower base 18).

In certain embodiments, the lower assembly 14 further comprises front and rear sidewalls 54a, 54b. More specifically, the front sidewall 54a is positioned towards a front of the lower base 18, and the rear sidewall 54b is positioned towards a rear of the lower base 18. Thus, the lower base 18 comprises three top surfaces, a front top surface and a rear top surface (being at the same height as one another), and a central top surface positioned therebetween (and being at a lower height than the front top surface and rear top surface). The front top surface and central top surface are connected to one another by the front sidewall 54a, and the rear top surface and central top surface are connected to one another by the rear sidewall 54b.

In certain embodiments, the lower assembly 14 further comprises front and rear retaining members 56a, 56b. More specifically, front retaining member 56a is positioned at or proximate to a front of the lower base 18 and secured to the front top surface of the lower base 18. Rear retaining member 56b is positioned at or proximate to a rear of the lower base 18 and secured to the rear top surface of the lower base 18. In this way, at least a portion of the front retaining member 56a extends over and past the front sidewall 54a (towards a center of the lower base 18), and at least a portion of the rear retaining member 56b extends over and past rear sidewall 54b (towards a center of the lower base 18). Accordingly, the central top surface of the lower base 18, the front and rear sidewalls 54a, 54b, and bottom surfaces of the front and rear retaining members 56a, 56b define a central channel 58 (e.g., extending from left to right through the lower base 18). The central channel 58 extends further than the central slot 52 on both the left and right sides of the lower base 18.

In certain embodiments, the shear plate 20 of the lower assembly 14 comprises a body 70, a front flange 72a extending from a front side of the body 70, and a rear flange 72b extending from a rear side of the body 70. The front and rear flanges 72a, 72b have a bottom surface flush with a bottom surface of the body 70, but are not the same height as the body 70, such that a top surface of the front and rear flanges 72a, 72b are not flush with a top surface of the body 70. The shear plate 20 further comprises a shear plate rack 74 (e.g., second rack, linear gear, etc.) extending along a bottom surface of the shear plate 20 (e.g., from a left side of the body 70 to a right side of the body 70). The shear plate rack 74 may be integrally or otherwise fixedly attached to the bottom surface of the shear plate 20.

The shear plate 20 is positioned between the lower base 18 and upper platform 16. More specifically, the shear plate 20 is positioned within the central channel 58, and the shear plate rack 74 is positioned within the central slot 52. The shear plate 20 is laterally translatable along the central channel 58. However, the width of the shear plate 20 corresponds in size and shape to the width of the front and rear sidewalls 54a, 54b, thereby preventing rotation of the shear plate 20 therein. Further, the front and rear flanges 72a, 72b are positioned between the top surface of the lower base 18 and the bottom surface of the front and rear retaining members 56a, 56b. Accordingly, the shear plate 20 cannot move vertically from the central channel 58 and is retained therein. Additionally, the lateral movement of the shear plate 20 is restricted by the shear plate rack 74 within the central slot 52, thereby preventing inadvertent removal of the shear plate 20 from the central channel 58.

In certain embodiments, the lower assembly 14 further comprises a shear pinion 80, and a shear motor 82 (e.g., servomotor, second motor, actuator, etc.) mechanically connected to and driving the shear pinion 80. In certain embodiments, the shear motor 82 may provide a maximum torque of 10 N·cm with a speed of 60°/s. In certain embodiments, the shear motor 82 is mounted to the lower base 18 (e.g., the shear motor 82 is positioned on or proximate to a bottom surface of the lower base 18) and the shear motor 82 is mechanically connected to the shear pinion 80, which is also mounted to the lower base 18 (e.g., positioned on or proximate to the bottom surface of the lower base 18). Accordingly, the shear motor 82 drives the shear pinion 80 (e.g., which may be embodied in or include one or more of a second pinion, a rotational gear, a rotational wheel, etc.). The shear pinion 80 is positioned in or proximate to the central slot 52 to engage the shear plate rack 74.

In certain embodiments, the lower assembly 14 may comprise an angular sensor 84 arranged in sensory communication with the shear pinion 80 and/or the shear motor 82 to angularly measure angular position of the shear pinion 80. In other words, the angular sensor 84 may measure the angular position of the shear pinion 80, which can then be processed (e.g., by a processor of a computer) to calculate a shear force exerted on the fingertip (explained in more detail below). In some embodiments, the angular sensor 84 processes the angular position of the shear pinion 80 and processes the measurement to calculate a shear force.

In certain embodiments, the lower assembly 14 may comprise left and right compressive racks 86a, 86b. More specifically, one end of the left compressive rack 86a (which may be embodied in or include one or more of a third rack, a linear gear, etc.) may be mounted to a left side of the lower base 18 such that the left compressive rack 86a extends upwardly therefrom. Similarly, one end of the right compressive rack 86b (which may be embodied in or include one or more of a first rack, a linear gear, etc.) may be mounted to a right side of the lower base 18 such that the right compressive rack 86b extends upwardly therefrom. Portions of the left and right compressive racks 86a, 86b (e.g., at an opposite end from which they are each mounted to the lower base 18) are received in the left and right compressive rack apertures 24a, 24b, respectively. Accordingly, the left and right compressive racks 86a, 86b are positioned on opposite lateral sides of the upper platform 16 and the lower base 18. A surface of each of the left and right compressive racks 86a, 86b may be contoured (e.g., keyed) to correspond in shape to a surface of the left and right compressive rack apertures 24a, 24b, respectively, to encourage stability and prevent rotation of the left and right compressive racks 86a, 86b within the left and right compressive rack apertures 24a, 24b. Further, when the left and right compressive racks 86a, 86b are positioned within the left and right compressive rack apertures 24a, 24b, the left and right compressive racks 86a, 86b engage the left and right compressive pinions 26a, 26b, respectively (as discussed in more detail below).

In certain embodiments, the lower assembly 14 may include a contact panel 88 positioned on the shear plate 20 (between the shear plate 20 and the upper assembly 12). The contact panel 88 (e.g., which may be embodied in or include sandpaper or another material providing a high coefficient of friction) provides for additional frictional engagement with a fingertip and to facilitate continuous static contact. The lower assembly 14 may also include a piezoresistive force sensor 90 positioned between the contact panel 88 and the shear plate 20. The piezoresistive force sensor 90 may be glued, adhered, mechanically joined, or otherwise affixed to the shear plate 20, and the piezoresistive force sensor 90 may be used to measure compressive force. Additionally, the contact panel 88 may be attached (e.g., glued, adhered, mechanically joined, etc.) to the piezoresistive force sensor 90 and/or the shear plate 20.

When assembled, the upper platform 16 is mechanically connected to the lower base 18 by the left compressive pinion 26a and left compressive rack 86a and/or by the right compressive pinion 26b and right compressive rack 86b. The compressive motor 28 is configured to drive the left and right compressive pinions 26a, 26b relative to the respective left and right compressive racks 86a, 86b to selectively translate the upper platform 16 in a vertical direction relative to the lower base 18.

When assembled, the shear plate rack 74 and shear pinion 80 mechanically connect the shear plate 20 to the lower base 18. The shear motor 82 is configured to drive the shear pinion 80 relative to the shear plate rack 74 to selectively translate the shear plate 20 in a lateral direction relative to the lower base 18.

The compressive motor 28 (responsive to electronic signals from electronics within the electronics housing 36) controls the vertical movement of the upper platform 16 relative to the lower base 18 and/or shear plate 20. More specifically, rotation of the compressive motor 28 drives the right compressive pinion 26b, which in turn drives the left compressive pinion 26a in an opposite direction. As mentioned above, the left compressive pinion 26a is engaged with the left compressive rack 86a, and the right compressive pinion 26b is engaged with the right compressive rack 86b. Rotation of the right compressive pinion 26b causes left compressive rack 86a to move relative to the left compressive pinion 26a, and causes the right compressive rack 86b to move relative to the right compressive pinion 26b. Both the left compressive rack 86a and the right compressive rack 86b thereby move in the same direction. As a result, the upper platform 16 moves relative to the lower base 18 and/or shear plate 20. Due to this relative movement, a compressive force can be applied to a fingertip by compressing the fingertip between the shear plate 20 and the fingertip support 34. In particular, this relative movement causes a compressive force (e.g., normal force, vertical force, linear compression, etc.) to be applied to a fingertip (e.g., skin surface thereof) by compressing the fingertip between the contact panel 88 and at least one of the finger support 32 and/or the fingertip support 34.

The shear motor 82 (responsive to electronic signals from electronics within the electronics housing 36) controls lateral movement of the shear plate 20 relative to the lower base 18. More specifically, rotation of the shear motor 82 drives the shear pinion 80, which in turn causes the shear plate rack 74 to move relative to the shear pinion 80, and causes the shear plate 20 to move relative to the lower base 18 within the central channel 58. Due to this relative movement, a shear force is applied to a fingertip by lateral movement of the bottom of the fingertip between the shear plate 20 and the fingertip support 34. In particular, this relative movement causes a shear force (e.g., lateral force, tangential force, sliding force, etc.) to be applied to a fingertip (e.g., skin surface thereof) by shearing the fingertip between the contact panel 88 and at least one of the finger support 32 and/or the fingertip support 34.

Application of normal and shear forces by the wearable fingertip device 10 to a fingertip may occur concurrently and/or consecutively. Additionally, the normal and shear forces applied may be to the same part of the finger (e.g., the finger pulp) in certain embodiments. Vertical translation of the upper platform 16 relative to the lower base 18 is generally perpendicular to lateral translation of the shear plate 20 relative to the lower base 18.

Figure 5A:
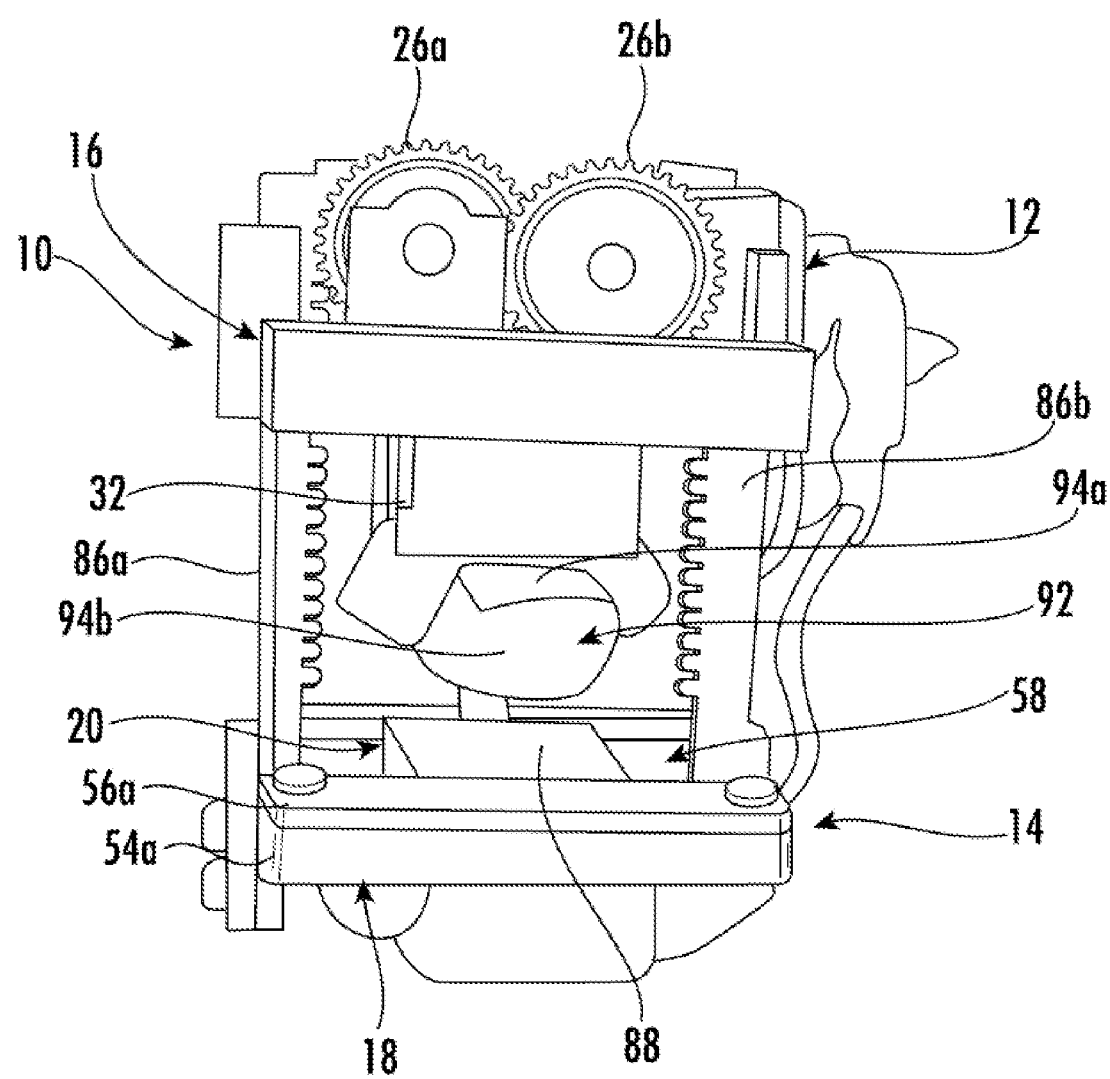
FIG. 5A is an illustration depicting placement of a fingertip within a wearable fingertip device according to FIG. 1.
Figure 5B:
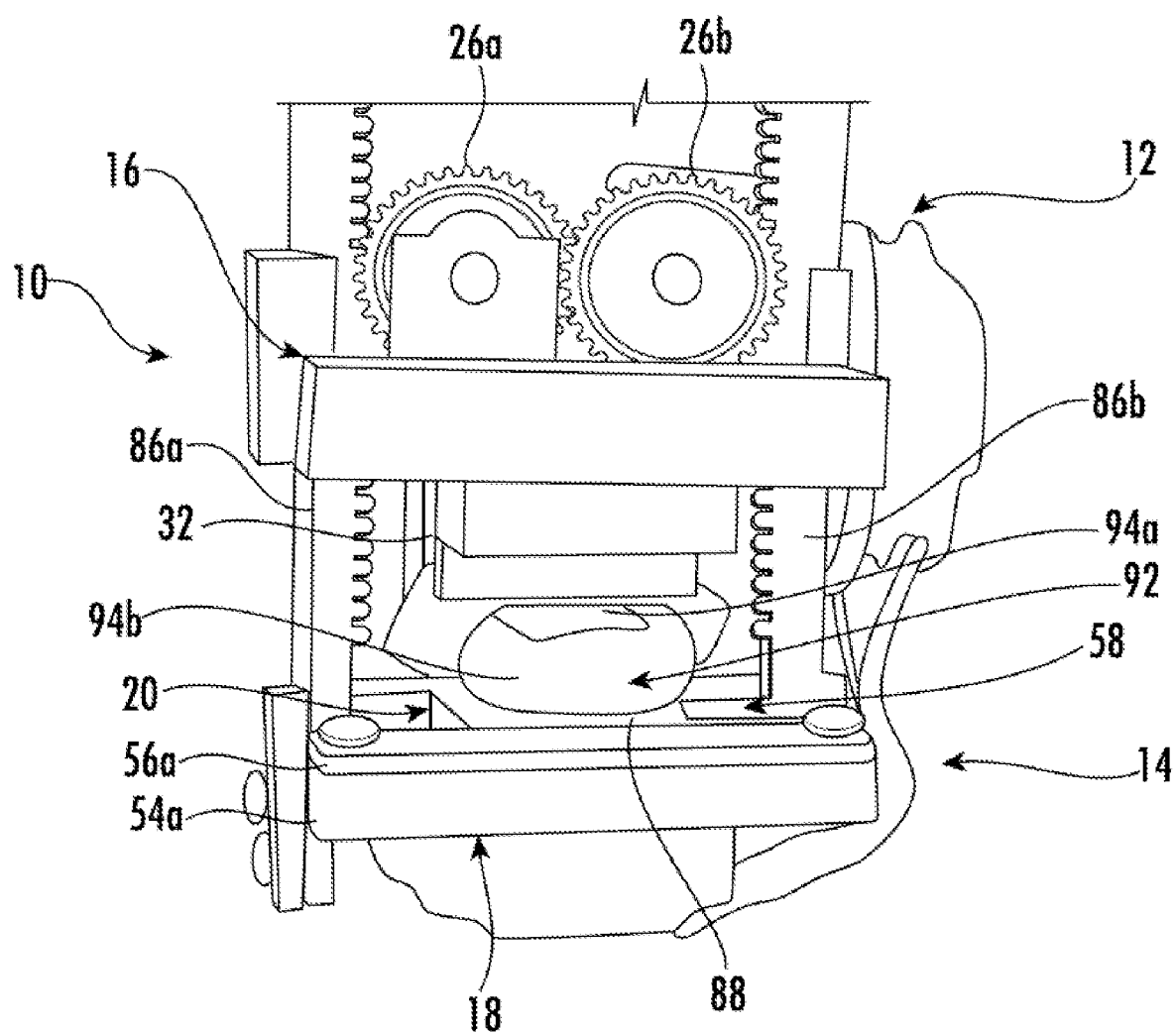
FIG. 5B is an illustration depicting the wearable fingertip device and fingertip of FIG. 5A upon application of a compressive force to the fingertip.
Figure 5C:
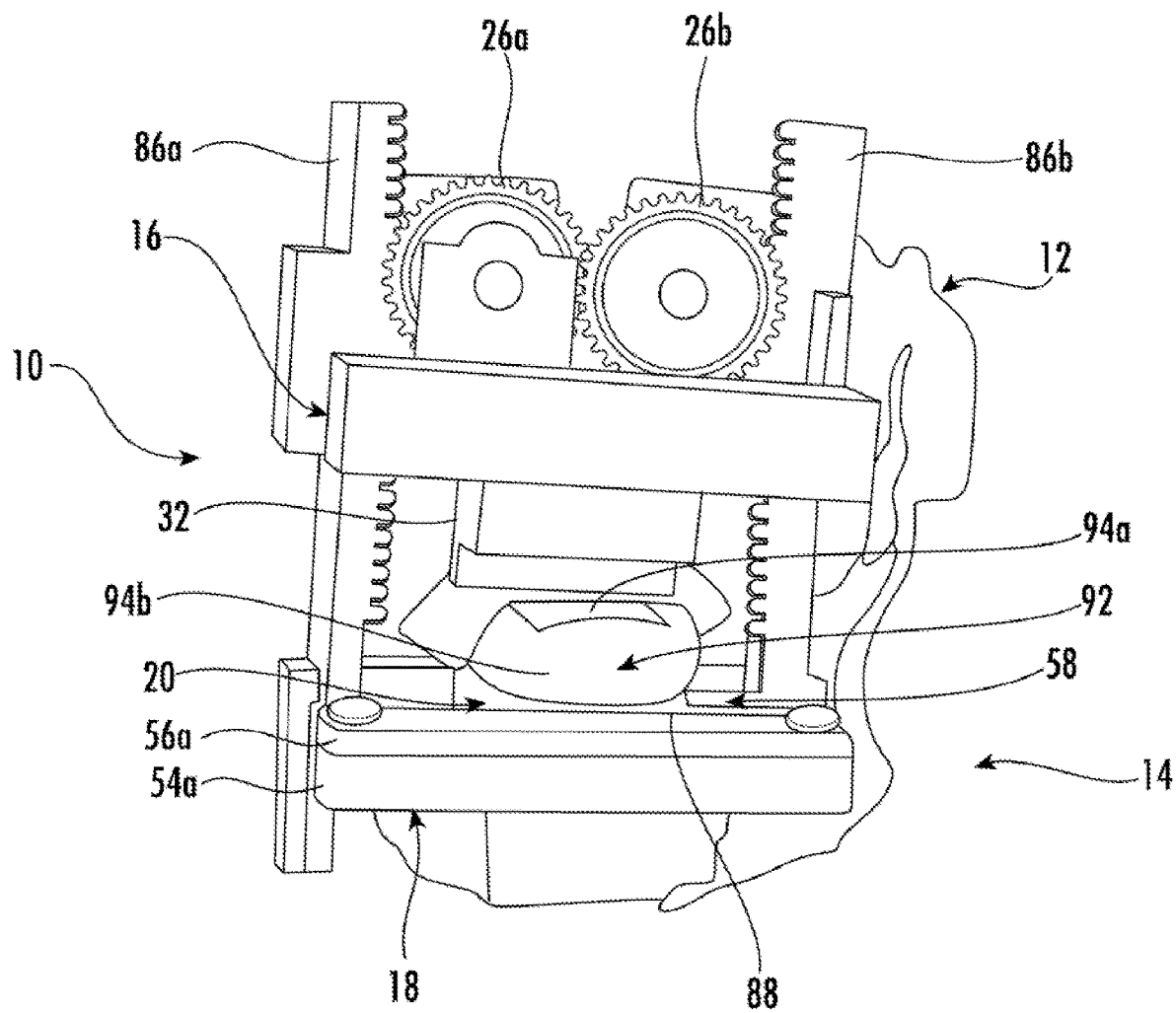
FIG. 5C is an illustration depicting the wearable fingertip device and fingertip of FIGS. 5A and 5B upon application of a shear force to the fingertip.

FIGS. 5A-5C are photographs depicting use of the wearable fingertip device 10 of FIG. 1. More specifically, FIG. 5A depicts placement of a fingertip within the wearable fingertip device 10 (e.g., between the upper platform 16 and at least one of the lower base 18 and/or the shear plate 20). A fingertip 92 having a top 94a (e.g., fingernail) and a bottom 94b (e.g., pulp) is inserted in the wearable fingertip device 10, between the upper platform 16 and the lower base 18. The upper platform 16 and the lower base 18 are in an open orientation. In other words, the distance between a bottom of the upper platform 16 and a top of the lower base 18 and/or shear plate 20 is greater than the height of the fingertip 92, such that a compressive force is not applied to the fingertip 92, which can be freely removed and inserted into the wearable fingertip device 10.

FIG. 5B depicts the wearable fingertip device 10 and fingertip 92 of FIG. 5A upon application of a compressive force to the fingertip 92. The compressive motor 28 (shown in FIGS. 1-3) drives the right compressive pinion 26b, which in turn drives the left compressive pinion 26a in an opposite direction. Rotation of the right compressive pinion 26b causes left compressive rack 86a to move relative to the left compressive pinion 26a, and causes the right compressive rack 86b to move relative to the right compressive pinion 26b. Both the left compressive rack 86a and the right compressive rack 86b thereby move in the same direction. As a result, the upper platform 16 moves relative to the lower base 18 and/or shear plate 20. This relative movement provides a compressive force to the fingertip 92 between the shear plate 20 and the fingertip support 34 (shown in FIGS. 1-3).

FIG. 5C depicts the wearable fingertip device 10 and fingertip 92 of FIG. 5A upon application of a shear force to the fingertip 92. While the wearable fingertip device 10 provides a compressive force, the shear motor 82 drives the shear pinion 80 (shown in FIGS. 2 and 4), which in turn causes the shear plate rack 74 to move relative to the shear pinion 80, and causes the shear plate 20 to move relative to the lower base 18 within the central channel 58. This applies a shear force to the fingertip 92 by lateral movement of the bottom of the fingertip 92 between the shear plate 20 and the upper platform 16. The remaining element numbers included in FIGS. 5A-5C are the same as previously described in connection with FIGS. 1-4.

Application of normal and shear forces by the wearable fingertip device 10 to a fingertip may occur concurrently and/or consecutively. Additionally, the normal and shear forces applied may be to the same part of the finger (e.g., the finger pulp) in certain embodiments.

In certain embodiments, the compressive and shear forces provided by the wearable fingertip devices can provide haptic feedback and alter physical perception. For example, if the wearable fingertip devices are worn on two or more fingers of a hand, then such devices could be synchronized with a virtual reality system to provide the sensation of gripping an object (e.g., through compressive forces) or twisting an object (e.g., through shear forces)

Figure 6:
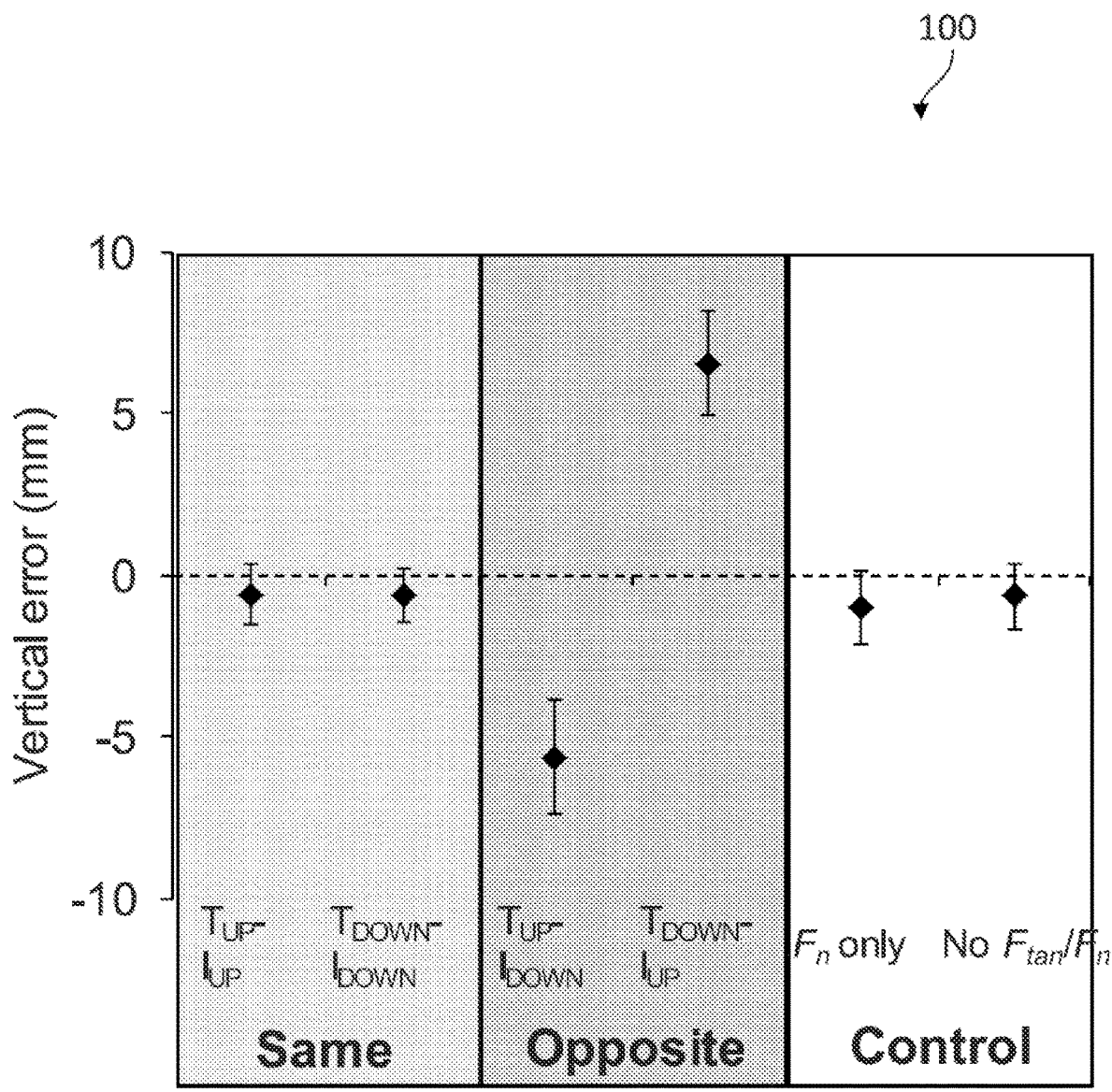
FIG. 6 is a plot of matching error representing perceived vertical distance between fingertips of the thumb and index finger for 10 subjects wearing a first wearable fingertip device on a thumb and a second wearable fingertip device on an index finger for performance of matching tasks according to six different conditions exerted by the thumb and index finger devices.

FIG. 6 is a plot 100 of matching error representing perceived vertical distance between fingertips of the thumb and index finger for 10 subjects wearing a first wearable fingertip device on a thumb and a second wearable fingertip device on an index finger for performance of matching tasks according to six different conditions exerted by the thumb and index finger devices. In a set of "same" conditions, a compressive force (normal force) was applied to the thumb and index finger, and a shear force (tangential force) was applied to the thumb and index finger in the same direction. In a first condition, the thumb and index finger were both subjected to an upward shear force ($T_{UP}$-$I_{UP}$), and in a second condition, the thumb and index finger were both subjected to a downward shear force ($T_{DOWN}$-$I_{DOWN}$). In a set of "opposite" conditions (including third and fourth conditions), a compressive force (normal force) was applied to the thumb and index finger and a shear force (tangential force) was applied to the thumb and index finger in opposite directions. In a third condition, the thumb was subjected to an upward shear force and the index finger was subjected to a downward shear force ($T_{UP}$-$I_{DOWN}$) shear force, and in a fourth condition, the thumb was subjected to a downward shear force and the index finger was subjected to an upward shear force ($T_{DOWN}$-$I_{UP}$). In a set of "control" conditions (including fifth and sixth conditions), a shear force (tangential force) was not applied to the thumb and index finger. In a fifth condition, the thumb and index finger were both only subjected to a large compressive force ($F_n$, only). In a sixth condition, the thumb and index finger were both only subjected to a small or negligible compressive force (No $F_{tan}/F_n$). The matching errors indicated how accurately subjects matched the fingertip distance, where positive and negative matching errors indicated that subjects placed the thumb higher and lower, respectively, than the index finger.

It was observed that matching error was biased opposite to the direction of tangential forces. In particular, the thumb was placed lower than the index finger when the shear forces on the thumb and index finger $F_{tan}$ were directed upward and downward, respectively ($T_{UP}$-$I_{DOWN}$) and vice-versa ($T_{DOWN}$-$I_{UP}$). The plot 100 of FIG. 6 illustrates that the error by the subjects was greatest for the second set of opposite conditions ($T_{UP}$-$I_{DOWN}$ and $T_{DOWN}$-$I_{UP}$). Accordingly, the wearable finger device can provide haptic feedback and alter physical perceptions of users (e.g., as in a virtual reality environment).

To assess device performance for application of normal forces, compressive force (normal force) was measured by a force sensor embedded in the wearable finger device. As shown in Charts 1 and 2 below, a wearable finger device was able to produce constant normal forces across all of the above-identified six conditions.

CHART 1

| | Thumb Fn | | | | | |
|---|---|---|---|---|---|---|
| Condition | 1: UP-UP | 2: DN-DN | 3: UP-DN | 4: DN-UP | 5: Fn only | 6: No Fn/Ftan |
| Average | 4.35 | 4,35 | 4.39 | 4.33 | 4.34 | 0.01 |
| SD | 0.16 | 0.18 | 0.19 | 0.17 | 0.16 | 0.01 |

CHART 2

| | Index Fn | | | | | |
|---|---|---|---|---|---|---|
| Condition | 1: UP-UP | 2: DN-DN | 3: UP-DN | 4: DN-UP | 5: Fn only | 6: No Fn/Ftan |
| Average | 4.46 | 4.53 | 4.48 | 4.51 | 4.44 | 0.22 |
| SD | 0.36 | 0.36 | 0.34 | 0.37 | 0.43 | 0.16 |

Figure 7A:
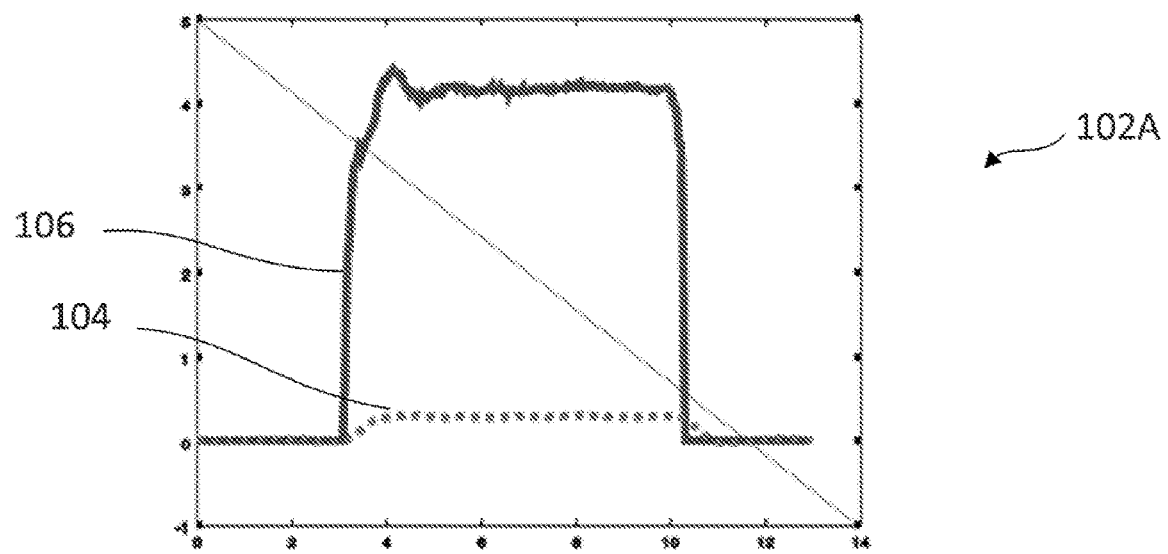
FIG. 7A provides superimposed line charts plotting motor current of a compressive motor and measured normal force versus time in seconds.
Figure 7B:
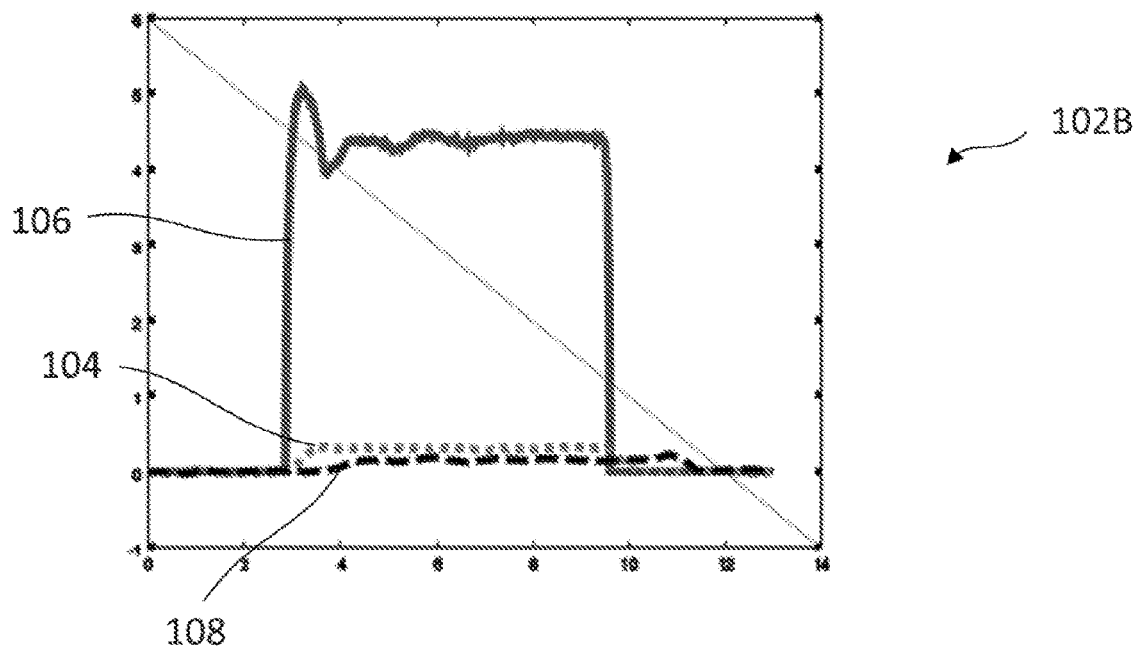
FIG. 7B provides superimposed line charts plotting motor current of a compressive motor, motor current of a shear motor, and measured normal force versus time in seconds.

FIGS. 7A and 7B are line charts depicting motor current to validate that the normal force and motor electric currents for both compressive (normal) and shear (tangential) forces reached and stayed within a target range for five seconds across all trials and conditions. FIG. 7A provides superimposed line charts 102A plotting motor current (in Amperes) of a compressive motor 104 and measured normal force 106 (in Newtons). As shown, the wearable fingertip device was able to apply a generally consistent compressive force, which is consistent with Charts 1 and 2 presented above. FIG. 7B provides superimposed line charts 102B plotting motor current (in Amperes) of the compressive motor 104, motor current (in Amperes) of a shear motor 108, and measured normal force 106 (in Newtons). As shown, addition of shear force (from the motor current of the shear motor 108) did not affect measured normal force 106 or the motor current of the compressive motor 104. Further, the motor current for the shear motor 108 was about half of the motor current for the compressive motor 104. The shear motor provided a shear force between 2-3 N. However, it is noted that the compressive motor and shear motor can provide a force of any desired magnitude.

Upon reading the foregoing description in light of the accompanying drawing figures, those skilled in the art will understand the concepts of the disclosure and will recognize applications of these concepts not particularly addressed herein. Those skilled in the art will recognize improvements and modifications to the preferred embodiments of the present disclosure. All such improvements and modifications are considered within the scope of the concepts disclosed herein and the claims that follow.

What is claimed is:

1. A device for providing cutaneous sensations to a fingertip, the device comprising:
    a lower base;
    an upper platform positioned over the lower base and mechanically connected to the lower base, the upper platform being selectively vertically translatable relative to the lower base to provide a compressive force to the fingertip when the fingertip is positioned between the upper platform and the lower base; and
    a shear plate positioned between the lower base and the upper platform and mechanically connected to the lower base, the shear plate being selectively laterally translatable relative to the lower base to provide a shear force to the fingertip when the fingertip is positioned between the upper platform and the lower base.

2. The device of claim 1, further comprising:
    a first rack and a first pinion mechanically connecting the upper platform to the lower base, and a first motor being configured to drive the first pinion relative to the first rack to selectively vertically translate the upper platform relative to the lower base.

3. The device of claim 2, further comprising:
a second rack and a second pinion mechanically connecting the shear plate to the lower base, and
a second motor being configured to drive the second pinion relative to the second rack to selectively laterally translate the shear plate relative to the lower base.

4. The device of claim 3, wherein the second rack is positioned along a bottom surface of the shear plate.

5. The device of claim 1, further comprising:
a first rack and a first pinion mechanically connecting the upper platform to the lower base;
a first motor being configured to drive the first pinion relative to the first rack to selectively vertically translate the upper platform relative to the lower base;
a second rack and a second pinion mechanically connecting the shear plate to the lower base; and
a second motor being configured to drive the second pinion relative to the second rack to selectively laterally translate the shear plate relative to the lower base;
wherein the first motor is mounted to the upper platform, and the second motor is mounted to the lower base.

6. The device of claim 5, further comprising a third rack and a third pinion mechanically connecting the upper platform to the lower base, the first rack and the third rack being positioned on opposite lateral sides of the upper platform and the lower base, and the third pinion being mechanically engaged with the first pinion and the third rack.

7. The device of claim 2, further comprising an upper angular sensor arranged in sensory communication with at least one of the first motor or the first pinion.

8. The device of claim 3, further comprising a lower angular sensor arranged in sensory communication with at least one of the second motor or the second pinion.

9. The device of claim 1, further comprising at least one force sensor positioned between the shear plate and the upper platform, and arranged to sense a compression force.

10. The device of claim 1, wherein vertical translation of the upper platform relative to the lower base is generally perpendicular to lateral translation of the shear plate relative to the lower base.

11. The device of claim 1, being configured for vertical translation of the upper platform relative to the lower base concurrently with lateral translation of the shear plate relative to the lower base.

12. A device for providing cutaneous sensations to a fingertip, the device comprising:
a lower base;
an upper platform positioned over the lower base;
a first rack and a first pinion mechanically connecting the lower base to the upper platform, the upper platform being configured to vertically translate relative to the lower base when the first pinion is rotated;
a first motor mechanically connected to the first pinion and configured to rotate the first pinion to provide a compressive force to the fingertip when the fingertip is positioned between the upper platform and the lower base;
a shear plate positioned between the lower base and the upper platform;
a second rack and a second pinion mechanically connecting the shear plate to the lower base, the shear plate being configured to laterally translate relative to the lower base when the second pinion is rotated; and
a second motor mechanically connected to the second pinion and configured to rotate the second pinion to provide a shear force to the fingertip when the fingertip is positioned between the upper platform and the lower base.

13. The device of claim 12, further comprising an upper angular sensor arranged in sensory communication with at least one of the first motor or the first pinion and a lower angular sensor arranged in sensory communication with at least one of the second motor or the second pinion.

14. The device of claim 12, further comprising at least one force sensor positioned between the shear plate and the upper platform, and arranged to sense a compression force.

15. The device of claim 12, wherein vertical translation of the upper platform relative to the lower base is generally perpendicular to lateral translation of the shear plate relative to the lower base.

16. The device of claim 12, being configured for vertical translation of the upper platform relative to the lower base concurrently with lateral translation of the shear plate relative to the lower base.

17. A device for providing cutaneous sensations to a fingertip, the device comprising:
a lower base;
a first rack, an end of the first rack fixedly attached to the lower base;
a first pinion mechanically engaged with the first rack;
an upper platform positioned over the lower base and defining a rack aperture, at least a portion of the first rack being positioned within the rack aperture;
a first motor mounted to the upper platform, the first motor being mechanically connected to the first pinion;
a shear plate positioned between the lower base and the upper platform, the shear plate comprising a second rack extending from a bottom surface of the shear plate;
a second pinion mechanically engaged with the second rack; and
a second motor mounted to the lower base, the second motor being mechanically connected to the second pinion;
wherein the first motor is configured to rotate the first pinion to vertically translate the upper platform relative to the lower base to provide a compressive force to the fingertip when the fingertip is positioned between the upper platform and the lower base; and
wherein the second motor is configured to rotate the second pinion to laterally translate the shear plate relative to the lower base to provide a shear force to the fingertip when the fingertip is positioned between the upper platform and the lower base.

18. The device of claim 17, further comprising a third rack and a third pinion mechanically connecting the upper platform to the lower base, the first rack and the third rack being positioned on opposite lateral sides of the upper platform and the lower base, and the third pinion being mechanically engaged with the first pinion and the third rack.

19. The device of claim 17, further comprising:
an upper angular sensor arranged in sensory communication with at least one of the first motor or the first pinion;
a lower angular sensor arranged in sensory communication with at least one of the second motor or the second pinion; and
at least one force sensor positioned between the shear plate and the upper platform, and arranged to sense a compression force.

20. The device of claim 17, wherein vertical translation of the upper platform relative to the lower base is generally perpendicular to lateral translation of the shear plate relative to the lower base.

21. The device of claim 17, being configured for vertical translation of the upper platform relative to the lower base concurrently with lateral translation of the shear plate relative to the lower base.

\* \* \* \* \*